United States Patent
Zhou et al.

(10) Patent No.: US 12,048,056 B2
(45) Date of Patent: Jul. 23, 2024

(54) CANCELLATION INDICATOR WITH CONFIGURABLE CANCELLED DIRECTION

(71) Applicant: QUALCOMM Incorporated, San Diego, CA (US)

(72) Inventors: Yan Zhou, San Diego, CA (US); Xiaoxia Zhang, San Diego, CA (US); Seyedkianoush Hosseini, San Diego, CA (US); Tao Luo, San Diego, CA (US); Jing Sun, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/203,460

(22) Filed: Mar. 16, 2021

(65) Prior Publication Data

US 2021/0298117 A1    Sep. 23, 2021

Related U.S. Application Data

(60) Provisional application No. 62/992,086, filed on Mar. 19, 2020.

(51) Int. Cl.
*H04W 76/36* (2018.01)
*H04W 72/1263* (2023.01)
*H04W 72/50* (2023.01)

(52) U.S. Cl.
CPC ....... *H04W 76/36* (2018.02); *H04W 72/1263* (2013.01); *H04W 72/535* (2023.01)

(58) Field of Classification Search
CPC .. H04L 1/1887; H04W 52/146; H04W 76/27; H04W 72/04; H04W 72/044; H04W 72/082; H04W 28/08
See application file for complete search history.

(56) References Cited

U.S. PATENT DOCUMENTS

| 9,338,769 B1 | 5/2016 | Naim et al. |
| 2004/0170192 A1 | 9/2004 | Herrmann |

(Continued)

FOREIGN PATENT DOCUMENTS

| CN | 106792924 A | 5/2017 |
| CN | 109644430 A | 4/2019 |
| WO | 2009134196 A1 | 11/2009 |

OTHER PUBLICATIONS

Qualcomm Incorporated: "Uplink Inter-UE Tx Multiplexing and Prioritization", 3GPP Draft, 3GPP TSG-RAN WG1 #98b, R1-1911122, Uplink Inter-UE Tx Multiplexing and Prioritization, 3rd Generation Partnership Project (3GPP), Sophia-Antipolis Cedex, vol. RAN WG1, No. Chongqing, China, Oct. 14, 2019-Oct. 20, 2019, Oct. 8, 2019, XP051809292, 9 pages, Retrieved from the Internet: URL:https://ftp.3gpp.org/tsg_ran/WG1_RL1/TSGR1_98b/Docs/R1-1911122.zip, [retrieved on Oct. 8, 2019], Section 2.3, paragraph 2.2, figure 3, The whole document.

(Continued)

*Primary Examiner* — Romani Ohri
(74) *Attorney, Agent, or Firm* — Arent Fox LLP/Qualcomm Incorporated

(57) ABSTRACT

A user equipment (UE) may receive an indicator that indicates cancellation of one or more scheduled transmissions on a group of resources. The indicator has a format that is configurable to indicate whether scheduled transmissions in a downlink direction, an uplink direction, or both are cancelled. The indicator may include an indication of the group of resources and zero or more flags indicating a direction of transmissions that are canceled, or the indicator may include two or more groups of resources that each apply to one or both of the downlink direction or the uplink direction. The UE may cancel one or more transmissions in response to the indicator.

28 Claims, 9 Drawing Sheets

(56) References Cited

U.S. PATENT DOCUMENTS

| | | |
|---|---|---|
| 2009/0092066 A1 | 4/2009 | Chindapol et al. |
| 2012/0236771 A1 | 9/2012 | Luo et al. |
| 2016/0094314 A1 | 3/2016 | Wong et al. |
| 2016/0278083 A1* | 9/2016 | Dinan .................... H04L 5/0098 |
| 2017/0079060 A1 | 3/2017 | Keating et al. |
| 2018/0063865 A1* | 3/2018 | Islam .................... H04L 5/0064 |
| 2018/0351705 A1 | 12/2018 | Uchino et al. |
| 2019/0058516 A1 | 2/2019 | Yang et al. |
| 2019/0098612 A1* | 3/2019 | Babaei .............. H04W 72/0446 |
| 2019/0104536 A1 | 4/2019 | Wang et al. |
| 2019/0109686 A1* | 4/2019 | Jiang .................... H04L 5/0053 |
| 2019/0149269 A1 | 5/2019 | Chatterjee et al. |
| 2019/0254088 A1 | 8/2019 | Park et al. |
| 2019/0342944 A1 | 11/2019 | Chatterjee et al. |
| 2020/0015206 A1* | 1/2020 | Lee .................... H04W 72/0446 |
| 2020/0059947 A1 | 2/2020 | Li et al. |
| 2020/0077297 A1 | 3/2020 | Kudo et al. |
| 2020/0146028 A1* | 5/2020 | Yang .................... H04L 5/0064 |
| 2020/0296701 A1* | 9/2020 | Park .................... H04L 1/1887 |
| 2021/0298047 A1 | 9/2021 | Zhou et al. |
| 2021/0351884 A1 | 11/2021 | Huang et al. |
| 2021/0385903 A1* | 12/2021 | Wang ............... H04W 72/1273 |

OTHER PUBLICATIONS

International Search Report and Written Opinion—PCT/US2021/022795—ISA/EPO—Jun. 16, 2021.

\* cited by examiner

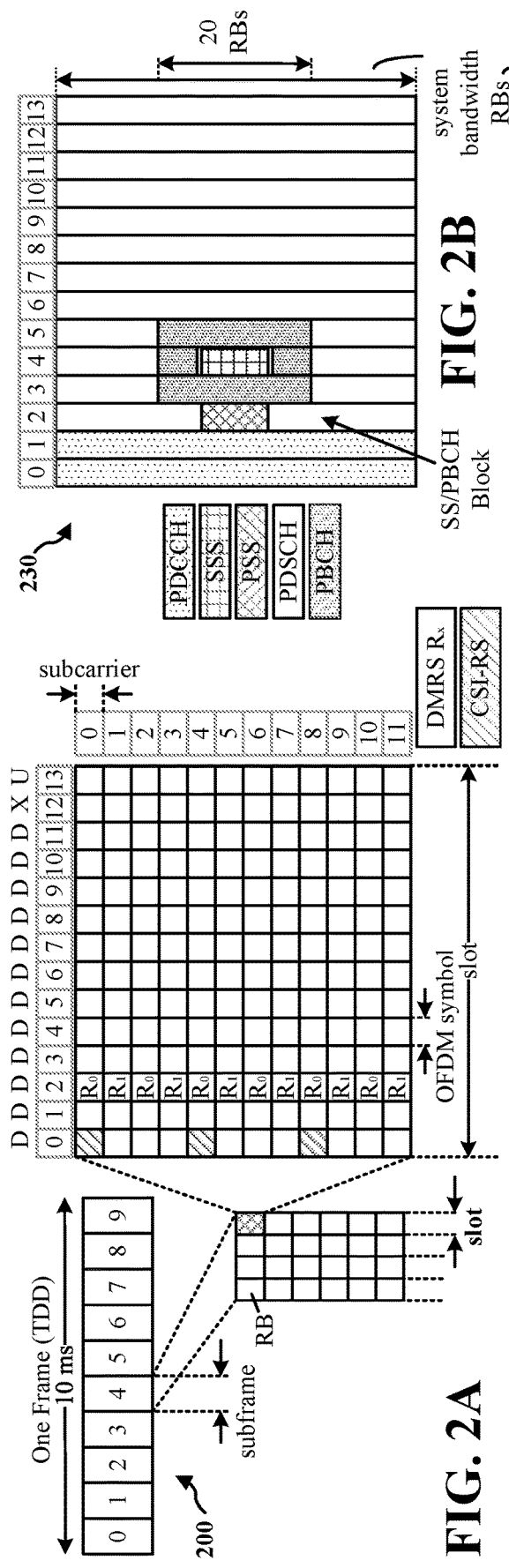
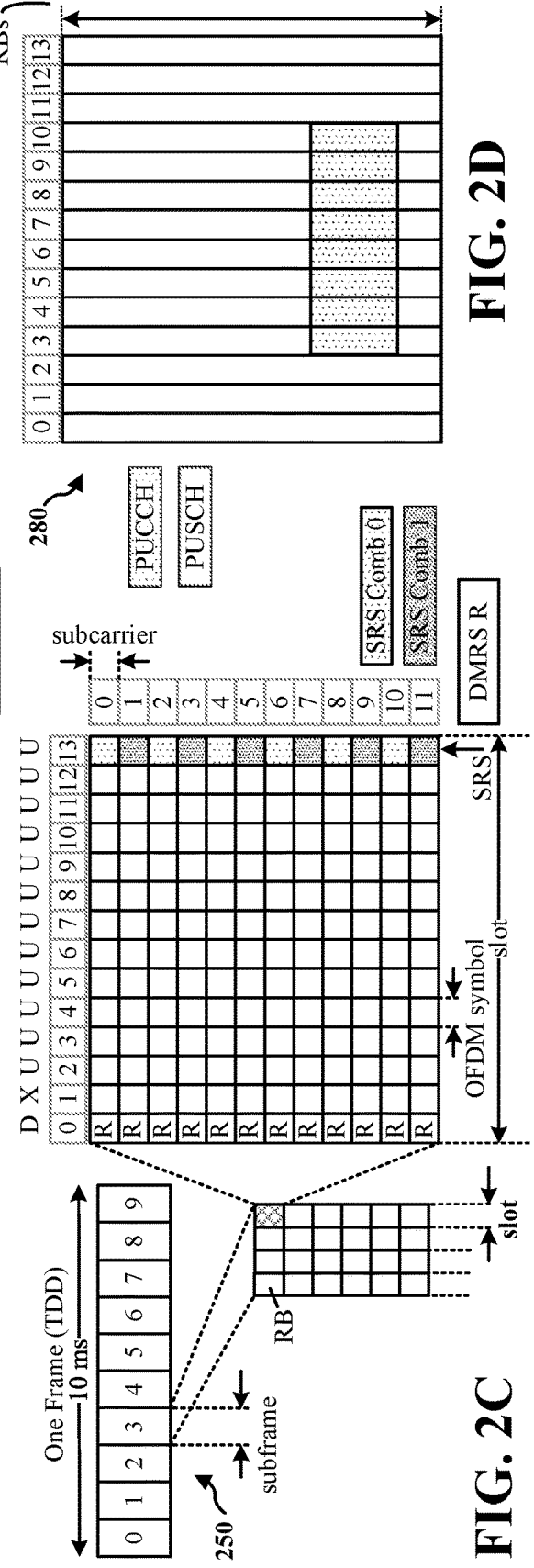

CANCELLATION INDICATOR WITH CONFIGURABLE CANCELLED DIRECTION

CROSS REFERENCE TO RELATED APPLICATIONS

This application claims priority to U.S. Provisional Application No. 62/992,086 titled "CANCELLATION INDICATOR WITH CONFIGURABLE CANCELLED DIRECTION," filed Mar. 19, 2020, which is assigned to the assignee hereof, and incorporated herein by reference in its entirety.

BACKGROUND

Technical Field

The present disclosure relates generally to communication systems, and more particularly, to apparatus and methods of handling cancellation indicators that conflict with scheduled transmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure provides a method, apparatus (e.g., a UE), and non-transitory computer readable medium for cancelling scheduled transmissions. The method may include receiving an indicator that indicates cancellation of one or more scheduled transmissions on a group of resources. The indicator has a format that is configurable to indicate whether scheduled transmissions in a downlink direction, an uplink direction, or both are cancelled. The method may include cancelling one or more transmissions in response to the indicator The disclosure also provides an apparatus including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the present disclosure provides a method, apparatus (e.g., a base station), and non-transitory computer readable medium for cancelling scheduled transmissions for a base station. The method may include transmitting an indicator that indicates cancellation of one or more scheduled transmissions on a group of resources. The indicator has a format that is configurable to indicate whether scheduled transmissions in a downlink direction, an uplink direction, or both are cancelled. The method may include cancelling one or more transmissions in response to the indicator The disclosure also provides an apparatus including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

DETAILED DESCRIPTION

Figure 1:
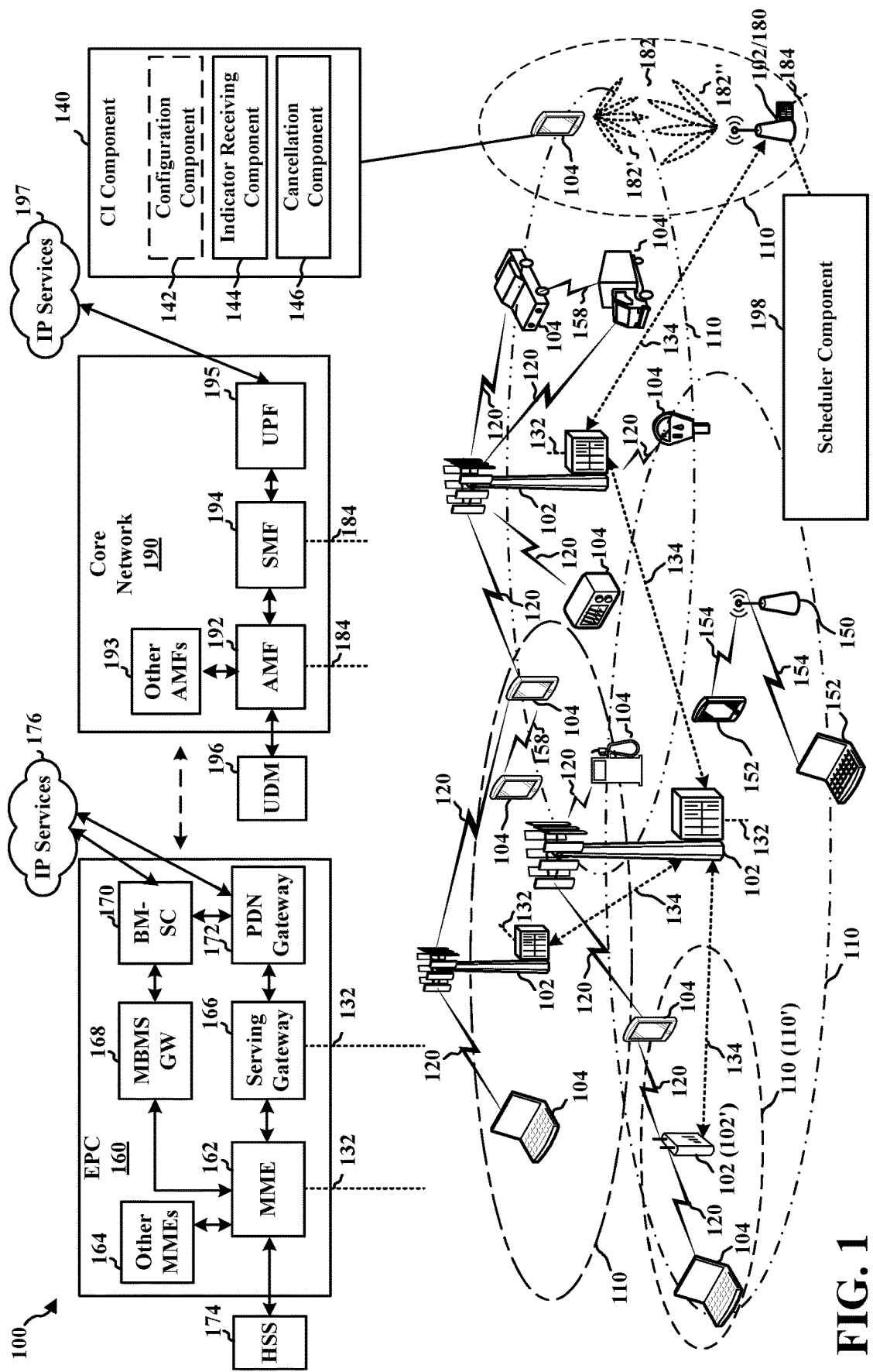
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A cancellation indicator (CI) may be transmitted by a base station to indicate resources on which a user equipment (UE) is not to transmit. For example, the base station may transmit a CI to make previously scheduled resources available for a URLLC communication. When the UE receives a CI, the UE may cancel uplink transmissions including physical uplink shared channel (PUSCH) and/or sounding reference signal (SRS) transmissions. The UE may proceed with other transmissions such as physical uplink control channel (PUCCH).

The specificity of the cancellation indicator may not provide for cancellation of all transmissions that may be desirable. For example, downlink transmissions may be configured in advance by higher layers using semi-persistent scheduling (SPS). Current mechanisms may not provide for cancelling an SPS configured downlink transmission in advance. An alternative technique is a preemption indicator (PI) that may be transmitted by a base station to indicate that resources were preempted and a transmission for a UE was punctured. A PI, however, involves a separate downlink control information (DCI) and does not cancel a future downlink transmission. Accordingly, even if a PI is used to indicate preemption of a SPS configured downlink transmission, the UE may still receive the DCI as well as the resources for the downlink transmission before determining that the downlink transmission was cancelled. In view of the foregoing, enhancements to a cancellation indicator that provide for cancellation of a broader range of signals may be desirable.

In an aspect of the present disclosure, a UE may receive an indicator that indicates cancellation of one or more scheduled transmissions on a group of resources. The indicator may have a format that is configurable to indicate whether scheduled transmissions in a downlink direction, an uplink direction, or both are cancelled. The UE may cancel one or more transmissions in response to the indicator. In various implementations, the indicator may include an indication of a group of resources and zero or more flags indicating a direction of transmissions that are cancelled. In various implementations, the indicator may include two or more groups of resources that each apply to one or both of the downlink direction or the uplink direction. The indicator may include an indication of whether transmissions in another direction on the same time domain resources are canceled. The cancellation may apply to only a set of channels or signal types in the indicated direction. The cancellation may apply to only the portion of the transmissions overlapping a group of resources or may apply to an entire transmission with an overlapping portion.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a CI component 140 for cancelling one or more transmissions in response to an indicator. The CI component 140 may include a configuration component 142 that configures an indicator format to indicate a direction of the transmissions to be cancelled. The CI component 140 may include an indicator receiving component 144 that receives an indicator that indicates cancellation of one or more scheduled transmissions on a group of resources. The CI component 140 may include a cancellation component 146 that cancels one or more transmissions in response to the indicator.

Figure 5:
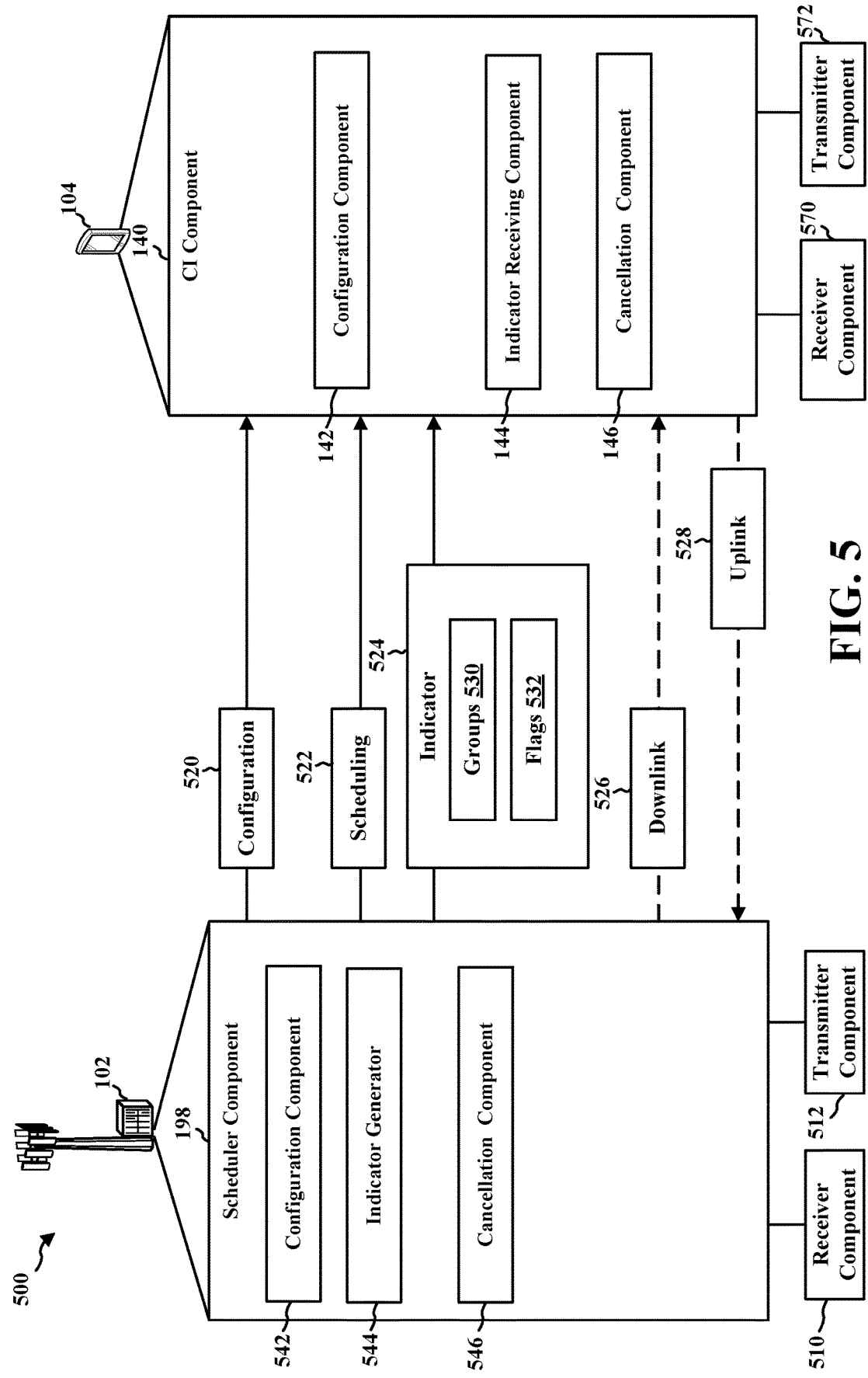
FIG. 5 is a diagram illustrating example communications and components for a base station and a UE.

In an aspect, one or more of the base stations 102 may include a scheduler component 198 that cancels one or more scheduled transmissions. As illustrated in FIG. 5, the scheduler component 198 may include a configuration component 542 that configures an indicator format to indicate a direction of the transmissions to be cancelled. The scheduler component 198 may include an indicator generator 544 that transmits an indicator that indicates cancellation of one or more scheduled transmissions on a group of resources. The scheduler component 198 may include a cancellation component 546 that cancels one or more transmissions in response to the indicator.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency domain duplexed (FDD) in which for a particular set of subcarriers (carrier system bandwidth), subframes within the set of subcarriers are dedicated for either DL or UL, or may be time domain duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
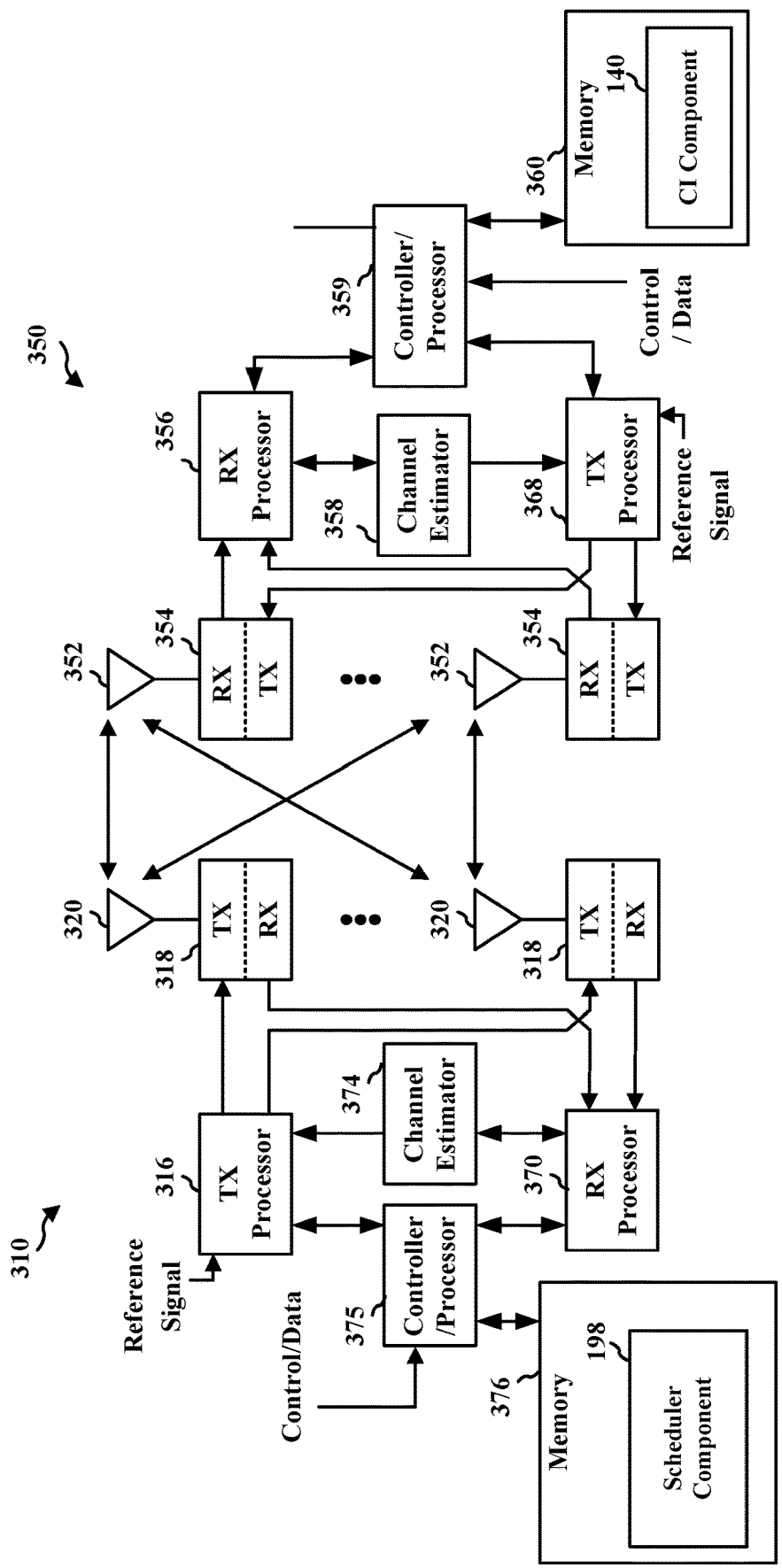
FIG. 3 is a diagram illustrating an example of a base station and a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with, and coupled to, a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an acknowledge (ACK) and/or negative acknowledge (NACK) protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with, and coupled to, a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the CI component 140 of FIG. 1. For example, the memory 360 may include executable instructions defining the CI component 140. The TX processor 368, the RX processor 356, and/or the controller/processor 359 may be configured to execute the CI component 140.

At least one of the TX processor 316, the RX processor 370, and the controller/processor 375 may be configured to perform aspects in connection with the scheduler component 198 of FIG. 1. For example, the memory 376 may include executable instructions defining the scheduler component 198. The TX processor 368, the RX processor 356, and/or the controller/processor 359 may be configured to execute the scheduler component 198.

Figure 4:
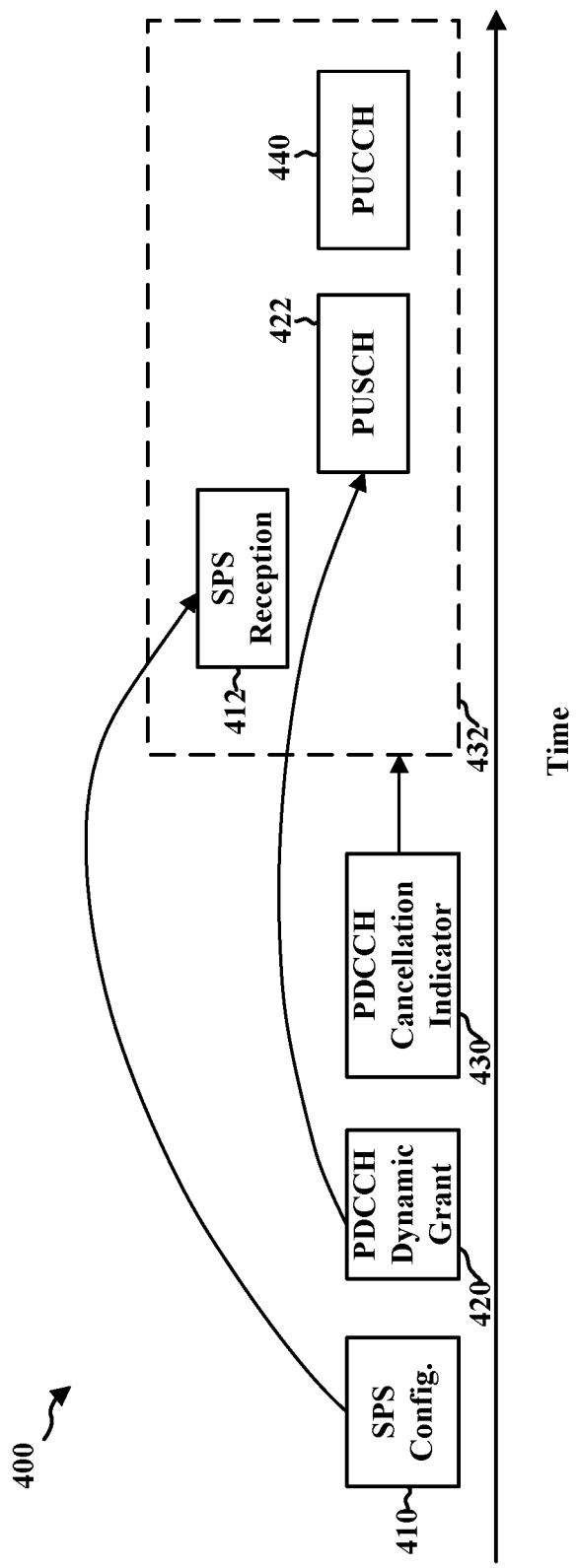
FIG. 4 is a diagram illustrating examples of scheduling indicators.

FIG. 4 is a timing diagram 400 including example communications between a UE 104 and a base station 102. The UE 104 may receive a message such as an SPS configuration 410 that schedules a first reception such as SPS reception 412. The SPS reception 412 may be, for example, a periodic reception on first resources. The resources may refer to time domain resources (e.g., slots or symbols) and frequency domain resources (e.g., subcarriers, resource elements, or resource blocks). The UE 104 may receive a first indication such as PDCCH dynamic grant 420 for a first transmission such as PUSCH 422. The PDCCH dynamic grant 420 may be, for example, a DCI having DCI format 0_0 or 0_1.

In an aspect, a base station 102 may determine to cancel one or more previously scheduled transmissions. For example, a base station 102 may determine to free up resources for a URLLC communication. The base station 102 may autonomously preempt a downlink transmission for the URLLC communication. For example, the base station 102 may transmit a PI if the SPS reception 412 is preempted. The PI may inform the UE 104 of preempted resources and the UE 104 may adjust decoding behavior in response. The PI, however, may not cancel the SPS reception 412 in advance. The PI may also not cancel uplink transmissions because the UE 104 would transmit on the resources before receiving the PI. The base station 102 may transmit a CI to cancel uplink transmissions such as PUSCH 422. A standard CI, however, may apply to only PUSCH and/or SPS transmissions. The standard CI may not be able to cancel downlink transmissions. Additionally, the CI may not be able to cancel uplink transmissions such as PUCCH 440.

In an aspect, the present disclosure provides for extensions to a CI that allow flexibility in cancelling transmissions. The UE 104 may receive a PDCCH cancellation indicator 430. For example, the PDCCH cancellation indicator 430 may be a DCI having DCI format 2_4, or an extension thereof. The PDCCH cancellation indicator 430 may be configurable to indicate a direction of cancelled transmissions. The PDCCH cancellation indicator 430 may indicate one or more regions 432 in which certain transmissions are cancelled. A region 432 may be a group of resources (e.g., time domain resources and frequency domain resources). The PDCCH cancellation indicator 430 may indicate a direction of transmissions that are cancelled. For example, the direction may be uplink, downlink, or both. In some implementations, the PDCCH cancellation indicator 430 may indicate a sidelink transmit and/or a sidelink receive direction. Accordingly, the PDCCH cancellation indicator 430 may cancel any of the SPS reception 412, the PUSCH 422, or the PUCCH 440.

FIG. 5 is a diagram 500 illustrating example communications and components of a base station 102 and a UE 104. The base station 102 includes the scheduler component 198 and the UE 104 includes the CI component 140. The scheduler component 198 may be implemented by the memory 376 and the TX processor 316, the RX processor 370, and/or the controller/processor 375 of FIG. 3. For example, the memory 376 may store instructions executable by the TX processor 316, the RX processor 370, and/or the controller/processor 375. The CI component 140 may be implemented by the memory 360 and the TX processor 368, the RX processor 356, and/or the controller/processor 359. For example, the memory 360 may store instructions executable by the TX processor 368, the RX processor 356, and/or the controller/processor 359.

The base station 102 may include a receiver component 510, which may include, for example, a radio frequency (RF) receiver for receiving the signals described herein. The base station 102 may include a transmitter component 512, which may include, for example, an RF transmitter for transmitting the signals described herein. In an aspect, the receiver component 510 and the transmitter component 512 may be co-located in a transceiver such as illustrated by the TX/RX 318 in FIG. 3.

As discussed briefly above with respect to FIG. 1, the scheduler component 198 may include the configuration component 542, the indicator generator 544, and the cancellation component 546.

The configuration component 542 may transmit a configuration message 520 that configures an indicator 524 to indicate a direction of transmissions to be cancelled. In a first implementation, the indicator 524 includes an indication of a group of resources 530 and zero or more flags 532 indicating a direction of transmissions that are cancelled. Alternatively, the indicator 524 includes one or more flags 532 indicating a direction of transmissions that are cancelled. The configuration message may indicate which flags 532 are included in the indicator 524, for example, by indicating a number of bits or a size of a field for the flags 532. Each flag 532 may correspond to a direction. The base station 102 may select the directions to be cancelled when transmitting the indicator 524 by setting a value of each flag 532. In an implementation, if the indicator 524 is configured to include zero flags, a default direction defined in a standards document or regulation may be indicated. In a second implementation, the indicator 524 may include two or more groups of resources 530. The configuration message 520 may configure a number of the groups of resources 530 and an order of directions to which the groups of resources 530 apply. For example, the first group of resources 530 may apply to the uplink direction and the second group of resources 530 may apply to the downlink direction, or vice versa. Alternatively, a default order may be defined in a standards document or regulation, and the configuration message 520 may configure only the number of the groups of resources 530.

The scheduler component 198 may schedule the UE 104 to receive downlink transmissions 526 or transmit uplink transmissions 528. For example, the scheduler component 198 may transmit a scheduling message 522 to schedule the UE 104. The scheduling message 522 may be a SPS configuration, a configured grant (CG), or a dynamic grant.

The indicator generator 544 may generate and transmit the indicator 524 that indicates cancellation of one or more scheduled transmissions on one or more corresponding groups of resources 530. The indicator 524 has a format that is configurable to indicate whether scheduled transmission in the downlink direction, the uplink direction, or both are cancelled. For example, the format of the indicator 524 may be configured by the configuration component 542, as discussed above.

The cancellation component 546 may cancel one or more transmissions based on the indicator 524. For downlink transmissions 526, the cancellation component 546 may prevent transmission of the previously scheduled downlink transmissions 526. The cancellation component 546 may instead transmit a different transmission. For uplink transmissions 528, the cancellation component 546 may turn off the receiver component 510 or ignore a received signal on the indicated resources.

As discussed above, the UE 104 or the CI component 140 may include the configuration component 142, the indicator receiving component 144, and the cancellation component 146. The UE 104 may include a receiver component 570, which may include, for example, a RF receiver for receiving the signals described herein. The UE 104 or the CI component 140 may include a transmitter component 572, which may include, for example, an RF transmitter for transmitting the signals described herein. In an aspect, the receiver component 570 and the transmitter component 572 may co-located in a transceiver such illustrated by the TX/RX 318 in FIG. 3.

Figure 6:
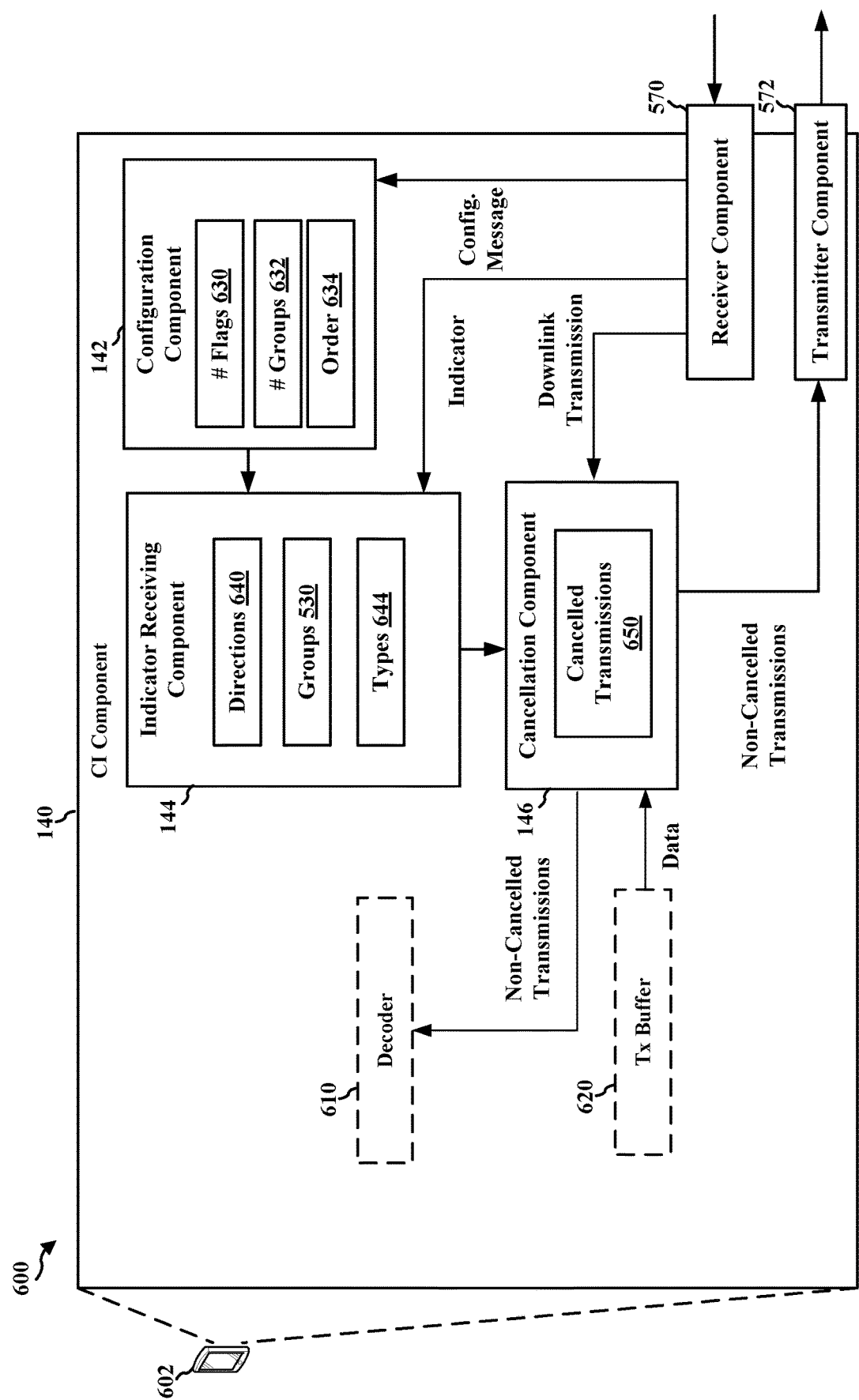
FIG. 6 is a conceptual data flow diagram illustrating an example data flow between different means/components in an example UE including a cancellation indicator (CI) component.

FIG. 6 is a conceptual data flow diagram 600 illustrating the data flow between different means/components in an example UE 602, which may be an example of the UE 104 (or UE 350) including the CI component 140 with reference to FIGS. 1, 3, and 5.

The receiver component 570 may receive various signals including the configuration message 520, the indicator 524, and/or the downlink transmission 526. The receiver component 570 may provide the configuration message 520 to the configuration component 142. The receiver component 570 may provide the indicator 524 to the indicator receiving component 144. The receiver component 570 may provide the downlink transmission 526 to the cancellation component 146.

The configuration component 142 may receive the configuration message 520. The configuration component 142 may extract configuration parameters from the configuration message 520. For example, the configuration parameters may include a number of flags 630 to be included in the indicator 524, a number of groups 632 in the indicator 524, and/or an order 634. The configuration component 142 may provide the configuration parameters to the indicator receiving component 144.

The indicator receiving component 144 may receive the indicator 524 from the receiver component 570. The indicator receiving component 144 may determine one or more directions 640 and one or more groups of resources 530 on which transmissions are cancelled. In various implementations, the indicator receiving component 144 may determine types 644 of transmission to which the cancellation is applicable. The types 644 for the downlink direction may include one of: a channel state information reference signal (CSI-RS), a synchronization signal block (SSB), a physical downlink shared channel (PDSCH), a physical downlink control channel (PDCCH), a positioning reference signal (PRS), or a combination thereof. The types 644 for the uplink direction may include one of: a physical uplink control channel (PUCCH), a physical uplink shared channel (PUSCH), a physical random access channel (PRACH), or a combination thereof. The types 644 may be indicated by the indicator 524, or by separate signaling such as the configuration message 520, an RRC message, a media access control (MAC) control element (CE) (MAC-CE), a DCI, or in a standards document or regulation. The indicator receiving component 144 may provide the directions 640, groups of resources 530, and types 644 to the cancellation component 146.

The cancellation component 146 may receive the directions 640, groups of resources 530, and types 644. The cancellation component 146 may determine cancelled transmissions 650. For example, the cancelled transmissions 650 may include scheduled transmissions on the groups of resources 530 in the directions 640. The cancelled transmissions 650 may correspond to the types 644. The cancellation component 146 may cancel the indicated cancelled transmissions 650. For example, for downlink transmissions 526, the cancellation component 146 may prevent the received signal from reaching the decoder 610. For downlink transmissions, the cancellation component 146 may prevent data from the Tx buffer 620 from being transmitted.

The transmitter component 572 may transmit only non-cancelled transmissions.

Figure 7:
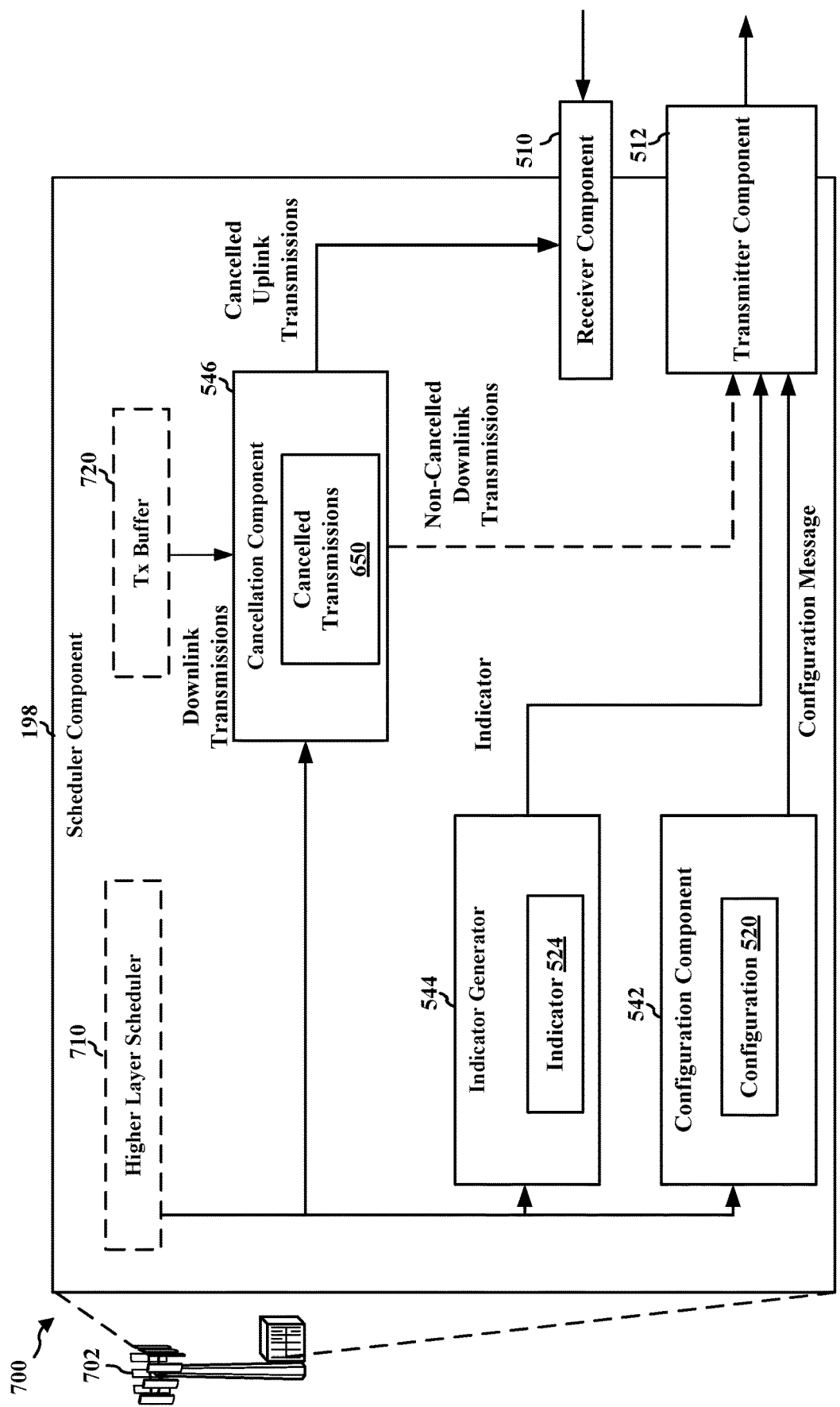
FIG. 7 is a conceptual data flow diagram illustrating an example data flow between different means/components in an example base station including a scheduler component.

FIG. 7 is a conceptual data flow diagram 700 illustrating the data flow between different means/components in an example base station 702, which may be an example of the base station 102 (or base station 310) and include the scheduler component 198 with reference to FIGS. 1, 3, and 5.

The scheduler component 198 may include a higher layer scheduler 710 that determines transmissions for one or more UEs 104. The higher layer scheduler 710 may control the configuration component 542, the indicator generator 544, and the cancellation component 546 to transmit messages and indicators to the UEs 104 to schedule the transmissions and cancel transmissions.

The configuration component 542 may generate the configuration message 520. As discussed above, the configuration message 520 may include the number of flags 630, the number of groups 632, and/or the order 634. The configuration component 542 may transmit the configuration message 520 via the transmitter component 512.

The indicator generator 544 may generate the indicator 524. As discussed above, the indicator 524 may include one or more groups of resources 530 and/or one or more flags 532. The indicator generator 544 may transmit the indicator 524 via the transmitter component 512.

The cancellation component 546 may cancel one or more transmissions. In an implementation, the cancellation component 546 may receive an indication of cancelled transmissions 650 from the higher layer scheduler 710. In another implementation, the cancellation component 546 may monitor the indicator generator 544 to determine the cancelled transmissions 650 based on the indicator 524. The cancellation component 546 may cancel transmissions from a Tx buffer 720. The cancellation component 546 may receive downlink transmissions from the Tx buffer 720 and prevent the cancelled transmissions 650 from being transmitted via the transmitter component 512. For uplink transmissions, the indicator 524 may prevent the UE 104 from transmitting the uplink transmissions. The cancellation component 546 may control the receiver component 510 to turn off when all uplink transmissions are cancelled.

Figure 8:
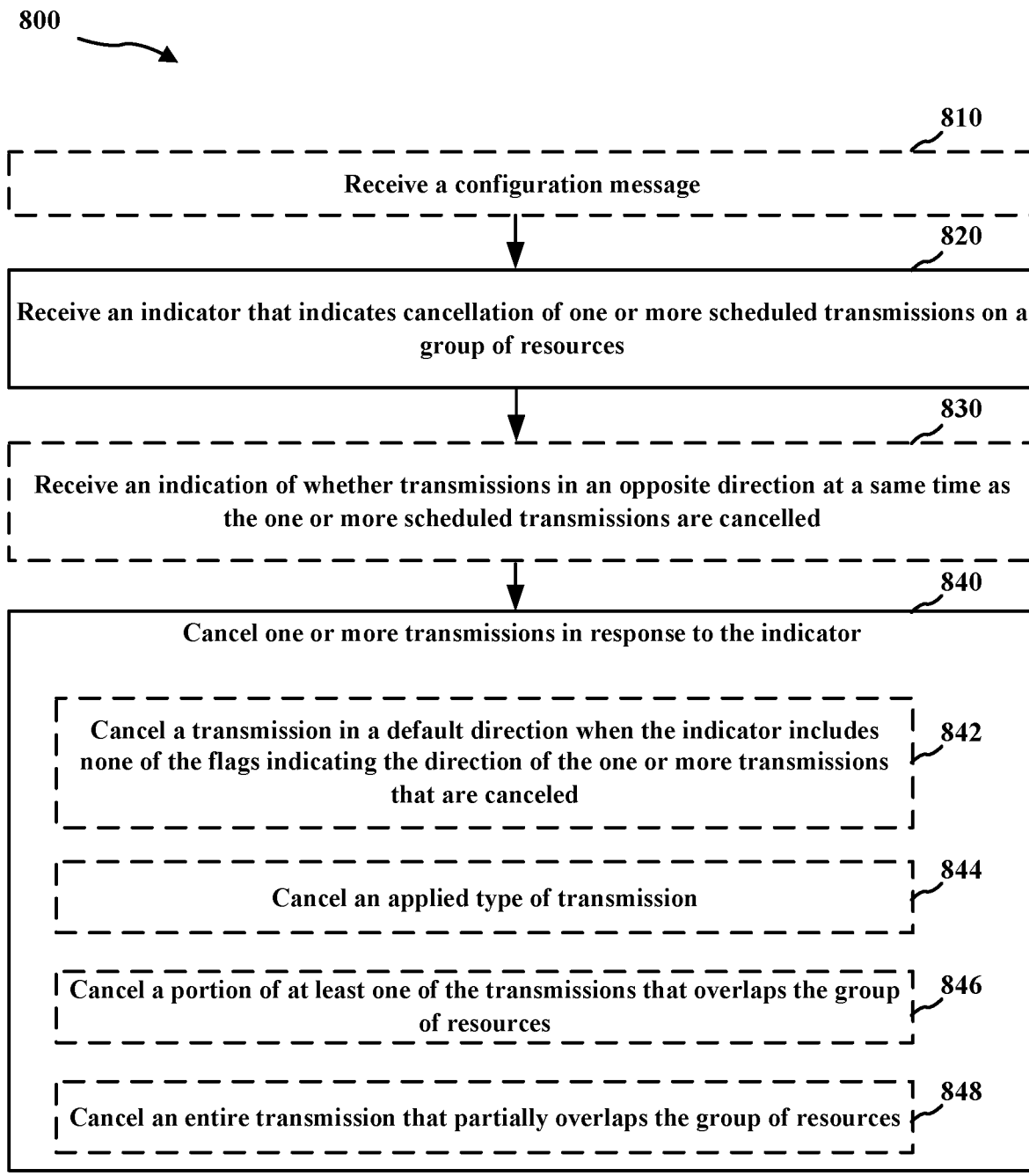
FIG. 8 is a flowchart of an example of a method for a UE to cancel one or more scheduled transmissions.

FIG. 8 is a flowchart of an example method 800 for cancelling scheduled transmissions. The method 800 may be performed by a UE (such as the UE 104, which may include the memory 360 and which may be the entire UE 104 or a component of the UE 104 such as the CI component 140, TX processor 368, the RX processor 356, or the controller/processor 359). The method 800 may be performed by the CI component 140 in communication with the scheduler component 198 of the base station 102.

At block 810, the method 800 may include receiving a configuration message. In an aspect, for example, the UE 104, the RX processor 356 and/or the controller/processor 359 may execute CI component 140 and/or the configuration component 142 to receive the configuration message. In a first implementation, the configuration message may indicate which flags are included in an indicator. In a second implementation, the configuration message may indicate an order of applying the two or more groups of resources to the downlink direction or the uplink direction. In either implementation, the configuration message may be one of a RRC message, a MAC-CE, or a DCI. Accordingly, the UE 104, the RX processor 356, and/or the controller/processor 359 executing the CI component 140 and/or the configuration component 142 may provide means for receiving a configuration message.

At block 820, the method 800 may include receiving an indicator that indicates cancellation of one or more scheduled transmissions on a group of resources. In an aspect, for example, the UE 104, the RX processor 356 and/or the controller/processor 359 may execute CI component 140 and/or the indicator receiving component 144 to receive the indicator that indicates cancellation of one or more scheduled transmissions on a group of resources. The indicator has a format that is configurable to indicate whether scheduled transmissions in a downlink direction, an uplink direction, or both are cancelled. For example, in the first implementation, the indicator includes an indication of the group of resources and zero or more flags (or, alternatively, one or more flags) indicating a direction of transmissions that are canceled. As another example, in the second implementation, the indicator includes two or more groups of resources that each apply to one or both of the downlink direction or the uplink direction. Accordingly, the UE 104, the RX processor 356, and/or the controller/processor 359 executing the CI component 140 and/or the indicator receiving component 144 may provide means for receiving an indicator that indicates cancellation of one or more scheduled transmissions on a group of resources.

At block 830, the method 800 may optionally include receiving an indication of whether transmissions in an opposite direction at a same time as the one or more scheduled transmissions are cancelled. In an aspect, for example, the UE 104, the RX processor 356 and/or the controller/processor 359 may execute CI component 140 and/or the indicator receiving component 144 to receive the indication of whether transmissions in an opposite direction at a same time as the one or more scheduled transmissions are cancelled. For instance, the indication may be one of a RRC message, a MAC-CE, the indicator, or a DCI. Accordingly, the UE 104, the RX processor 356, and/or the controller/processor 359 executing the CI component 140 and/or the indicator receiving component 144 may provide means for receiving an indication of whether transmissions in an opposite direction at a same time as the one or more scheduled transmissions are cancelled.

At block 840, the method 800 may include cancelling one or more transmissions in response to the indicator. In an aspect, for example, the UE 104, the RX processor 356 and/or the controller/processor 359 may execute CI component 140 and/or the cancellation component 146 to cancel one or more transmissions in response to the indicator. In the first implementation, at sub-block 842, the block 840 may optionally include cancelling a transmission in a default direction when the indicator includes none of the flags indicating the direction of the one or more transmissions that are canceled. In various implementations, at sub-block 844, the block 840 may optionally include cancelling an applied type of transmission. For instance, the applied type of transmission for the downlink direction may include one of: a channel state information reference signal (CSI-RS), a synchronization signal block (SSB), a physical downlink shared channel (PDSCH), a physical downlink control channel (PDCCH), a positioning reference signal (PRS), or a combination thereof. As another example, the applied type of transmission for the uplink direction includes one or more of a physical uplink control channel (PUCCH), a physical uplink shared channel (PUSCH), and a physical random access channel (PRACH). The applied type of transmission may be indicated by one of one of a RRC message, a MAC-CE, the indicator, or a DCI. Accordingly, the UE 104, the RX processor 356, and/or the controller/processor 359 executing the CI component 140 and/or the cancellation component 146 may provide means for cancelling one or more transmissions in response to the indicator. In various implementations, at sub-block 846, the block 840 may optionally include cancelling a portion of at least one of the transmissions that overlaps the group of resources. In various implementations, at sub-block 848, the block 840 may optionally include cancelling an entire transmission that partially overlaps the group of resources. The execution of sub-block 846 or sub-block 848 may depend on a type of the transmission. For example, for a CSI-RS, the sub-block 846 may be executed to cancel the portion of the CSI-RS that overlaps the group of resources. A remaining portion of the CSI-RS may still be useful, for example, for channel estimation. In contrast, for a PDSCH, the sub-block 848 may be executed to cancel the entire PDSCH because decoding a PDSCH with punctured resources may be likely to be decoded incorrectly.

Figure 9:
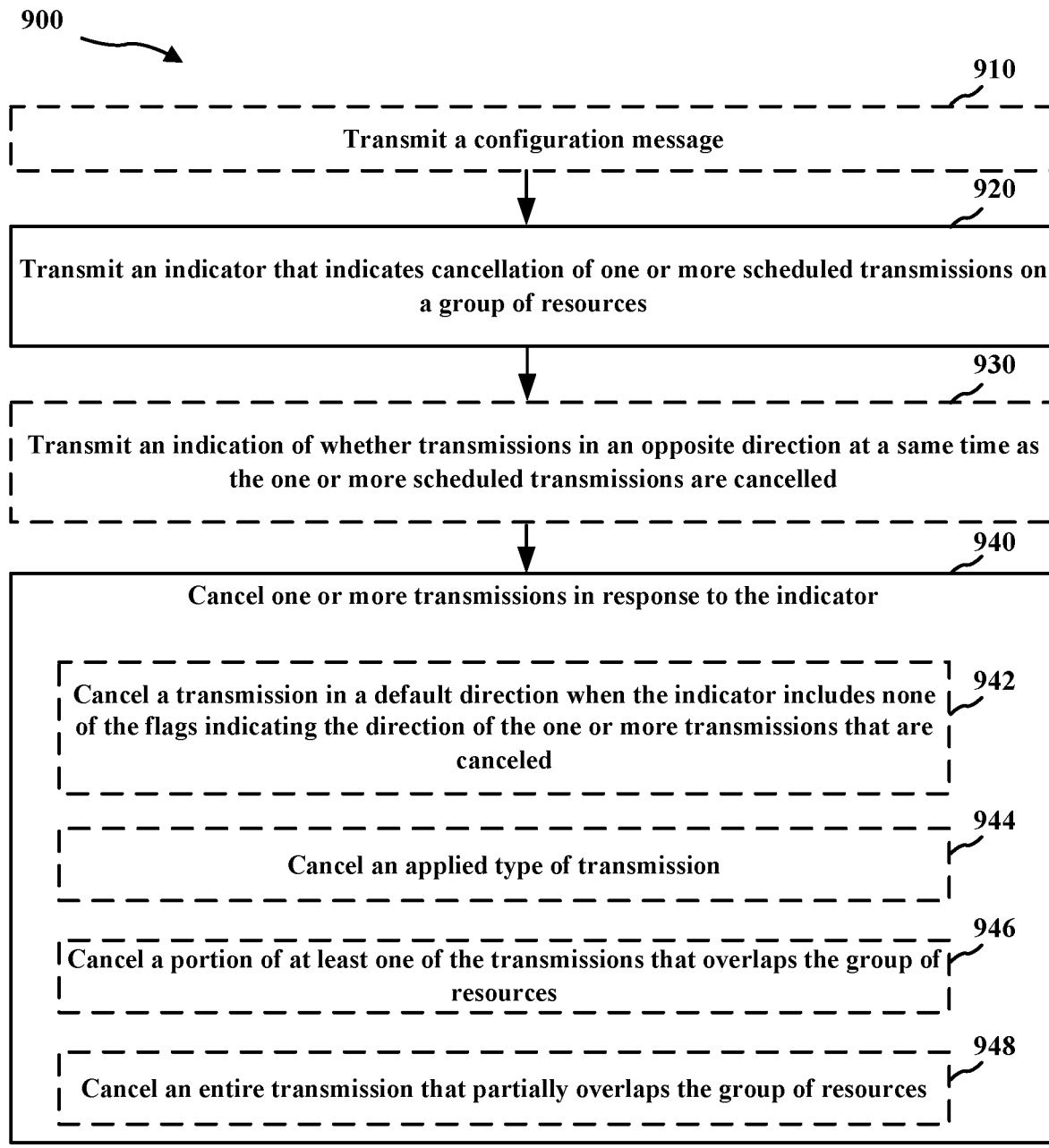
FIG. 9 is a flowchart of an example method for a base station to cancel one or more scheduled transmissions.

FIG. 9 is a flowchart of an example method 900 for cancelling scheduled transmissions. The method 900 may be performed by a base station (such as the base station 102, which may include the memory 376 and which may be the entire base station 102 or a component of the base station 102 such as the scheduler component 198, TX processor 316, the RX processor 370, or the controller/processor 375). The method 900 may be performed by the scheduler component 198 in communication with the CI component 140 of the UE 104.

At block 910, the method 900 may optionally include transmitting a configuration message. In an aspect, for example, the controller/processor 375, and/or the TX processor 316 may execute the scheduler component 198 and/or the configuration component 542 to transmit the configuration message. In a first implementation, the configuration message may indicate which flags are included in an indicator. In a second implementation, the configuration message may indicate an order of applying the two or more groups of resources to the downlink direction or the uplink direction. In either implementation, the configuration message may be one of a RRC message, a MAC-CE, or a DCI. Accordingly, the base station 102, the controller/processor 375, and/or the TX processor 316 executing the scheduler component 198 and/or the configuration component 542 may provide means for transmitting a configuration message.

At block 920, the method 900 may include transmitting an indicator that indicates cancellation of one or more scheduled transmissions on a group of resources. In an aspect, for example, the controller/processor 375, and/or the TX processor 316 may execute the scheduler component 198 and/or the indicator generator 544 to transmit the indicator that indicates cancellation of one or more scheduled transmissions on a group of resources. The indicator has a format that is configurable to indicate whether scheduled transmissions in a downlink direction, an uplink direction, or both are cancelled. For example, in the first implementation, the indicator includes an indication of the group of resources and zero or more flags (or, alternatively, one or more flags) indicating a direction of transmissions that are canceled. As another example, in the second implementation, the indicator includes two or more groups of resources that each apply to one or both of the downlink direction or the uplink direction. Accordingly, the base station 102, the controller/processor 375, and/or the TX processor 316 executing the scheduler component 198 and/or the indicator generator 544 may provide means for transmitting an indicator that indicates cancellation of one or more scheduled transmissions on a group of resources.

At block 930, the method 900 may optionally include transmitting an indication of whether transmissions in an opposite direction at a same time as the one or more scheduled transmissions are cancelled. In an aspect, for example, the controller/processor 375, and/or the TX processor 316 may execute the scheduler component 198 and/or the indicator generator 544 to transmit the indication of whether transmissions in an opposite direction at a same time as the one or more scheduled transmissions are cancelled. For instance, the indication may be one of a RRC message, a MAC-CE, the indicator 524, or a DCI. Accordingly, the base station 102, the controller/processor 375, and/or the TX processor 316 executing the scheduler component 198 and/or the indicator generator 544 may provide means for transmitting an indication of whether transmissions in an opposite direction at a same time as the one or more scheduled transmissions are cancelled.

At block 940, the method 900 may include cancelling one or more transmissions in response to the indicator. In an aspect, for example, the controller/processor 375, and/or the TX processor 316 may execute the scheduler component 198 and/or the cancellation component 546 to cancel one or more transmissions in response to the indicator. In the first implementation, at sub-block 942, the block 940 may optionally include cancelling a transmission in a default direction when the indicator includes none of the flags indicating the direction of the one or more transmissions that are canceled. In various implementations, at optional sub-block 944, the block 940 may optionally include cancelling an applied type of transmission. For instance, the applied type of transmission for the downlink direction may include one of: a channel state information reference signal (CSI-RS), a synchronization signal block (SSB), a physical downlink shared channel (PDSCH), a physical downlink control channel (PDCCH), a positioning reference signal (PRS), or a combination thereof. As another example, the applied type of transmission for the uplink direction includes one or more of a physical uplink control channel (PUCCH), a physical uplink shared channel (PUSCH), and a physical random access channel (PRACH). The applied type of transmission may be indicated by one of one of a RRC message, a MAC-CE, the indicator, or a DCI. In various implementations, at sub-block 946, the block 940 may optionally include cancelling a portion of at least one of the transmissions that overlaps the group of resources. In various implementations, at sub-block 948, the block 940 may optionally include cancelling an entire transmission that partially overlaps the group of resources. The execution of sub-block 946 or sub-block 948 may depend on a type of the transmission. For example, for a CSI-RS, the sub-block 946 may be executed to cancel the portion of the CSI-RS that overlaps the group of resources. A remaining portion of the CSI-RS may still be useful, for example, for channel estimation. In contrast, for a PDSCH, the sub-block 948 may be executed to cancel the entire PDSCH because decoding a PDSCH with punctured resources may be likely to be decoded incorrectly. Accordingly, the base station 102, the controller/processor 375, and/or the TX processor 316 executing the scheduler component 198 and/or the cancellation component 146 may provide means for cancelling one or more transmissions in response to the indicator.

Some Further Example Clauses

Implementation examples are described in the following numbered clauses:
1. A method of wireless communication, comprising:
   receiving an indicator that indicates cancellation of one or more scheduled transmissions on a group of resources, wherein the indicator has a format that is configurable to indicate whether scheduled transmissions in a downlink direction, an uplink direction, or both are cancelled; and
   cancelling one or more transmissions in response to the indicator.
2. The method of clause 1, wherein the indicator includes an indication of the group of resources and zero or more flags indicating a direction of transmissions that are canceled.
3. The method of clause 2, further comprising receiving a configuration message indicating which flags are included in the indicator.
4. The method of clause 3, wherein the configuration message is one of a radio resource control (RRC) message, a media access control control element (MAC-CE), or a DCI.
5. The method of clause 2, wherein cancelling the one or more transmissions comprises cancelling a transmission in a default direction when the indicator includes none of the flags indicating the direction of the one or more transmissions that are canceled.
6. The method of clause 1, wherein the indicator includes two or more groups of resources that each apply to one or both of the downlink direction or the uplink direction.
7. The method of clause 6, further comprising receiving a configuration message indicating an order of applying the two or more groups of resources to the downlink direction or the uplink direction.
8. The method of clause 7, wherein the configuration message is one of a radio resource control (RRC) message, a media access control element (MAC-CE), or a DCI.
9. The method of clause 6, wherein an order of applying the two or more groups of resources to the downlink direction or the uplink direction is a default order.
10. The method of any of clauses 1-9, further comprising receiving an indication of whether transmissions in an opposite direction at a same time as the one or more scheduled transmissions are cancelled.
11. The method of clause 10, wherein the indication is one of a radio resource control (RRC) message, a media access control element (MAC-CE), the indicator, or a DCI.
12. The method of any of clauses 1-11, wherein cancelling the one or more transmissions in response to the indicator comprises cancelling an applied type of transmission.
13. The method of clause 12, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.
14. The method of clause 12, wherein the applied type of transmission for the uplink direction includes one of: a physical uplink control channel (PUCCH), a physical uplink shared channel (PUSCH), a physical random access channel (PRACH), or a combination thereof.
15. The method of clause 12, wherein the applied type of transmission is indicated by one of a radio resource control (RRC) message, a media access control element (MAC-CE), the indicator, or a DCI.
16. The method of any of clauses 1-15, wherein cancelling the one or more transmissions in response to the indicator comprises cancelling a portion of at least one of the transmissions that overlaps the group of resources.
17. The method of any of clauses 1-15, wherein cancelling the one or more transmissions in response to the indicator comprises cancelling an entire transmission that partially overlaps the group of resources.
18. The method of any of clauses 1-15, wherein cancelling the one or more transmissions in response to the indicator comprises cancelling a portion of the transmission that overlaps the group of resources based on a type of the transmission or cancelling all of the transmission based on a type of the transmission.
19. The method of any of clauses 1-18, wherein the indicator includes a downlink control information (DCI).
20. A method of wireless communication, comprising:
   transmitting an indicator that indicates cancellation of one or more scheduled transmissions on a group of resources, wherein the indicator has a format that is configurable to indicate whether scheduled transmissions in a downlink direction, an uplink direction, or both are cancelled; and
   cancelling one or more transmissions in response to the indicator.

21. The method of clause 20, wherein the indicator includes an indication of the group of resources and zero or more flags indicating a direction of transmissions that are canceled.

22. The method of clause 21, further comprising transmitting a configuration message indicating which flags are included in the indicator.

23. The method of clause 22, wherein the configuration message is one of a radio resource control (RRC) message, a media access control element (MAC-CE), or a DCI.

24. The method of clause 21, wherein cancelling the one or more transmissions comprises cancelling a transmission in a default direction when the indicator includes none of the flags indicating the direction of the one or more transmissions that are canceled.

25. The method of clause 20, wherein the indicator includes two or more groups of resources that each apply to one or both of the downlink direction or the uplink direction.

26. The method of clause 25, further comprising transmitting a configuration message indicating an order of applying the two or more groups of resources to the downlink direction or the uplink direction.

27. The method of clause 26, wherein the configuration message is one of a radio resource control (RRC) message, a media access control element (MAC-CE), or a DCI.

28. The method of clause 25, wherein an order of applying the two or more groups of resources to the downlink direction or the uplink direction is a default order.

29. The method of any of clauses 20-28, further comprising transmitting an indication of whether transmissions in an opposite direction at a same time as the one or more scheduled transmissions are cancelled.

30. The method of clause 29, wherein the indication is one of a radio resource control (RRC) message, a media access control element (MAC-CE), the indicator, or a DCI.

31. The method of any of clauses 20-30, wherein cancelling the one or more transmissions in response to the indicator comprises cancelling an applied type of transmission.

32. The method of clause 31, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

33. The method of clause 31, wherein the applied type of transmission for the uplink direction includes one of: a physical uplink control channel (PUCCH), a physical uplink shared channel (PUSCH), a physical random access channel (PRACH), or a combination thereof.

34. The method of clause 31, wherein the applied type of transmission is indicated by one of one of a radio resource control (RRC) message, a media access control element (MAC-CE), the indicator, or a DCI.

35. The method of any of clauses 20-34, wherein cancelling the one or more transmissions in response to the indicator comprises cancelling a portion of at least one of the transmissions that overlaps the group of resources.

36. The method of any of clauses 20-34, wherein cancelling the one or more transmissions in response to the indicator comprises cancelling an entire transmission that partially overlaps the group of resources.

37. The method of any of clauses 20-34, wherein cancelling the one or more transmissions in response to the indicator comprises cancelling a portion of the transmission that overlaps the group of resources based on a type of the transmission or cancelling all of the transmission based on a type of the transmission.

38. The method of any of clauses 20-37, wherein the indicator includes a downlink control information (DCI).

39. An apparatus for wireless communication, comprising:
a memory storing computer-executable instructions; and
at least one processor coupled to the memory and configured to execute the instructions to:
receive an indicator that indicates cancellation of one or more scheduled transmissions on a group of resources, wherein the indicator has a format that is configurable to indicate whether scheduled transmissions in a downlink direction, an uplink direction, or both are cancelled; and
cancel one or more transmissions in response to the indicator.

40. The apparatus of clause 39, wherein the indicator includes an indication of the group of resources and zero or more flags indicating a direction of transmissions that are canceled.

41. The apparatus of clause 40, wherein the at least one processor is configured to receive a configuration message indicating which flags are included in the indicator.

42. The apparatus of clause 41, wherein the configuration message is one of a radio resource control (RRC) message, a media access control control element (MAC-CE), or a DCI.

43. The apparatus of clause 40, wherein the at least one processor is configured to cancel a transmission in a default direction when the indicator includes none of the flags indicating the direction of the one or more transmissions that are canceled.

44. The apparatus of clause 39, wherein the indicator includes two or more groups of resources that each apply to one or both of the downlink direction or the uplink direction.

45. The apparatus of clause 44, wherein the at least one processor is configured to receive a configuration message indicating an order of applying the two or more groups of resources to the downlink direction or the uplink direction.

46. The apparatus of clause 45, wherein the configuration message is one of a radio resource control (RRC) message, a media access control element (MAC-CE), or a DCI.

47. The apparatus of clause 44, wherein an order of applying the two or more groups of resources to the downlink direction or the uplink direction is a default order.

48. The apparatus of any of clauses 39-47, wherein the at least one processor is configured to receive an indication of whether transmissions in an opposite direction at a same time as the one or more scheduled transmissions are cancelled.

49. The apparatus of clause 48, wherein the indication is one of a radio resource control (RRC) message, a media access control element (MAC-CE), the indicator, or a DCI.

50. The apparatus of any of clauses 39-49, wherein the at least one processor is configured to cancel an applied type of transmission in response to the indicator.

51. The apparatus of clause 50, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

52. The apparatus of clause 50, wherein the applied type of transmission for the uplink direction includes one of: a physical uplink control channel (PUCCH), a physical uplink shared channel (PUSCH), a physical random access channel (PRACH), or a combination thereof.

53. The apparatus of clause 50, wherein the applied type of transmission is indicated by one of a radio resource control (RRC) message, a media access control element (MAC-CE), the indicator, or a DCI.

54. The apparatus of any of clauses 39-53, wherein the at least one processor is configured to cancel a portion of at least one of the transmissions that overlaps the group of resources.

55. The apparatus of any of clauses 39-53, wherein the at least one processor is configured to cancel an entire transmission that partially overlaps the group of resources.

56. The apparatus of any of clauses 39-53, wherein the at least one processor is configured to cancel a portion of the transmission that overlaps the group of resources based on a type of the transmission or cancelling all of the transmission based on a type of the transmission.

57. The apparatus of any of clauses 39-56, wherein the indicator includes a downlink control information (DCI).

58. An apparatus for wireless communication, comprising:
  a memory storing computer-executable instructions; and
  at least one processor coupled to the memory and configured to execute the instructions to:
    transmit an indicator that indicates cancellation of one or more scheduled transmissions on a group of resources, wherein the indicator has a format that is configurable to indicate whether scheduled transmissions in a downlink direction, an uplink direction, or both are cancelled; and
    cancel one or more transmissions in response to the indicator.

59. The apparatus of clause 58, wherein the indicator includes an indication of the group of resources and zero or more flags indicating a direction of transmissions that are canceled.

60. The apparatus of clause 59, wherein the at least one processor is configured to transmit a configuration message indicating which flags are included in the indicator.

61. The apparatus of clause 60, wherein the configuration message is one of a radio resource control (RRC) message, a media access control element (MAC-CE), or a DCI.

62. The apparatus of clause 59, wherein the at least one processor is configured to cancel a transmission in a default direction when the indicator includes none of the flags indicating the direction of the one or more transmissions that are canceled.

63. The apparatus of clause 58, wherein the indicator includes two or more groups of resources that each apply to one or both of the downlink direction or the uplink direction.

64. The apparatus of clause 63, wherein the at least one processor is configured to transmit a configuration message indicating an order of applying the two or more groups of resources to the downlink direction or the uplink direction.

65. The apparatus of clause 64, wherein the configuration message is one of a radio resource control (RRC) message, a media access control element (MAC-CE), or a DCI.

66. The apparatus of clause 63, wherein an order of applying the two or more groups of resources to the downlink direction or the uplink direction is a default order.

67. The apparatus of any of clauses 58-66, wherein the at least one processor is configured to transmit an indication of whether transmissions in an opposite direction at a same time as the one or more scheduled transmissions are cancelled.

68. The apparatus of clause 67, wherein the indication is one of a radio resource control (RRC) message, a media access control element (MAC-CE), the indicator, or a DCI.

69. The apparatus of any of clauses 58-68, wherein the at least one processor is configured to cancel an applied type of transmission.

70. The apparatus of clause 69, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

71. The apparatus of clause 69, wherein the applied type of transmission for the uplink direction includes one of: a physical uplink control channel (PUCCH), a physical uplink shared channel (PUSCH), a physical random access channel (PRACH), or a combination thereof.

72. The apparatus of clause 69, wherein the applied type of transmission is indicated by one of one of a radio resource control (RRC) message, a media access control element (MAC-CE), the indicator, or a DCI.

73. The apparatus of any of clauses 58-72, wherein the at least one processor is configured to cancel a portion of at least one of the transmissions that overlaps the group of resources.

74. The apparatus of any of clauses 58-72, wherein the at least one processor is configured to cancel an entire transmission that partially overlaps the group of resources.

75. The apparatus of any of clauses 58-72, wherein the at least one processor is configured to cancel a portion of the transmission that overlaps the group of resources based on a type of the transmission or cancelling all of the transmission based on a type of the transmission.

76. The apparatus of any of clauses 58-75, wherein the indicator includes a downlink control information (DCI).

77. An apparatus for wireless communication, comprising:
  means for receiving an indicator that indicates cancellation of one or more scheduled transmissions on a group of resources, wherein the indicator has a format that is configurable to indicate whether scheduled transmissions in a downlink direction, an uplink direction, or both are cancelled; and
  means for cancelling one or more transmissions in response to the indicator.

78. The apparatus of clause 77, wherein the indicator includes an indication of the group of resources and zero or more flags indicating a direction of transmissions that are canceled.

79. The apparatus of clause 78, further comprising means for receiving a configuration message indicating which flags are included in the indicator.

80. The apparatus of clause 79, wherein the configuration message is one of a radio resource control (RRC) message, a media access control control element (MAC-CE), or a DCI.

81. The apparatus of clause 78, wherein the means for cancelling the one or more transmissions is configured to cancel a transmission in a default direction when the indicator includes none of the flags indicating the direction of the one or more transmissions that are canceled.

82. The apparatus of clause 77, wherein the indicator includes two or more groups of resources that each apply to one or both of the downlink direction or the uplink direction.

83. The apparatus of clause 82, further comprising means for receiving a configuration message indicating an order of applying the two or more groups of resources to the downlink direction or the uplink direction.

84. The apparatus of clause 83, wherein the configuration message is one of a radio resource control (RRC) message, a media access control element (MAC-CE), or a DCI.

85. The apparatus of clause 82, wherein an order of applying the two or more groups of resources to the downlink direction or the uplink direction is a default order.

86. The apparatus of any of clauses 77-85, further comprising means for receiving an indication of whether transmissions in an opposite direction at a same time as the one or more scheduled transmissions are cancelled.

87. The apparatus of clause 86, wherein the indication is one of a radio resource control (RRC) message, a media access control element (MAC-CE), the indicator, or a DCI.

88. The apparatus of any of clauses 77-87, wherein the means for cancelling the one or more transmissions is configured to cancel an applied type of transmission.

89. The apparatus of clause 88, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

90. The apparatus of clause 88, wherein the applied type of transmission for the uplink direction includes one of: a physical uplink control channel (PUCCH), a physical uplink shared channel (PUSCH), a physical random access channel (PRACH), or a combination thereof.

91. The apparatus of clause 88, wherein the applied type of transmission is indicated by one of a radio resource control (RRC) message, a media access control element (MAC-CE), the indicator, or a DCI.

92. The apparatus of any of clauses 77-91, wherein the means for cancelling the one or more transmissions is configured to cancel a portion of at least one of the transmissions that overlaps the group of resources.

93. The apparatus of any of clauses 77-91, wherein the means for cancelling the one or more transmissions is configured to cancel an entire transmission that partially overlaps the group of resources.

94. The apparatus of any of clauses 77-91, wherein the means for cancelling the one or more transmissions is configured to cancel a portion of the transmission that overlaps the group of resources based on a type of the transmission or cancelling all of the transmission based on a type of the transmission.

95. The apparatus of any of clauses 77-94, wherein the indicator includes a downlink control information (DCI).

96. An apparatus for wireless communication, comprising:
means for transmitting an indicator that indicates cancellation of one or more scheduled transmissions on a group of resources, wherein the indicator has a format that is configurable to indicate whether scheduled transmissions in a downlink direction, an uplink direction, or both are cancelled; and
means for cancelling one or more transmissions in response to the indicator.

97. The apparatus of clause 96, wherein the indicator includes an indication of the group of resources and zero or more flags indicating a direction of transmissions that are canceled.

98. The apparatus of clause 97, further comprising means for transmitting a configuration message indicating which flags are included in the indicator.

99. The apparatus of clause 98, wherein the configuration message is one of a radio resource control (RRC) message, a media access control element (MAC-CE), or a DCI.

100. The apparatus of clause 97, wherein the means for cancelling the one or more transmissions is configured to cancel a transmission in a default direction when the indicator includes none of the flags indicating the direction of the one or more transmissions that are canceled.

101. The apparatus of clause 96, wherein the indicator includes two or more groups of resources that each apply to one or both of the downlink direction or the uplink direction.

102. The apparatus of clause 101, further comprising means for transmitting a configuration message indicating an order of applying the two or more groups of resources to the downlink direction or the uplink direction.

103. The apparatus of clause 102, wherein the configuration message is one of a radio resource control (RRC) message, a media access control element (MAC-CE), or a DCI.

104. The apparatus of clause 102, wherein an order of applying the two or more groups of resources to the downlink direction or the uplink direction is a default order.

105. The apparatus of any of clauses 96-104, further comprising means for transmitting an indication of whether transmissions in an opposite direction at a same time as the one or more scheduled transmissions are cancelled.

106. The apparatus of clause 105, wherein the indication is one of a radio resource control (RRC) message, a media access control element (MAC-CE), the indicator, or a DCI.

107. The apparatus any of clauses 96-106, wherein the means for cancelling the one or more transmissions is configured to cancel an applied type of transmission.

108. The apparatus of clause 107, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

109. The apparatus of clause 107, wherein the applied type of transmission for the uplink direction includes one of: a physical uplink control channel (PUCCH), a physical uplink shared channel (PUSCH), a physical random access channel (PRACH), or a combination thereof.

110. The apparatus of clause 107, wherein the applied type of transmission is indicated by one of one of a radio resource control (RRC) message, a media access control element (MAC-CE), the indicator, or a DCI.

112. The apparatus of any of clauses 96-110, wherein the means for cancelling the one or more transmissions is configured to cancel a portion of at least one of the transmissions that overlaps the group of resources.

113. The apparatus of clauses 96-110, wherein the means for cancelling the one or more transmissions is configured to cancel an entire transmission that partially overlaps the group of resources.

114. The apparatus of clauses 96-110, wherein the means for cancelling the one or more transmissions is configured to cancel a portion of the transmission that overlaps the group of resources based on a type of the transmission or cancelling all of the transmission based on a type of the transmission.

115. The apparatus of clauses 96-114, wherein the indicator includes a downlink control information (DCI).

116. A non-transitory computer-readable medium storing computer executable code, the code when executed by a processor instructs the processor to:

receive an indicator that indicates cancellation of one or more scheduled transmissions on a group of resources, wherein the indicator has a format that is configurable to indicate whether scheduled transmissions in a downlink direction, an uplink direction, or both are cancelled; and cancel one or more transmissions in response to the indicator.

117. The non-transitory computer-readable medium of clause 116, wherein the indicator includes an indication of the group of resources and zero or more flags indicating a direction of transmissions that are canceled.

118. The non-transitory computer-readable medium of clause 117, further comprising code to receive a configuration message indicating which flags are included in the indicator.

119. The non-transitory computer-readable medium of clause 118, wherein the configuration message is one of a radio resource control (RRC) message, a media access control control element (MAC-CE), or a DCI.

120. The non-transitory computer-readable medium of clause 117, wherein the code to cancel the one or more transmissions comprises code to cancel a transmission in a default direction when the indicator includes none of the flags indicating the direction of the one or more transmissions that are canceled.

121. The non-transitory computer-readable medium of clause 116, wherein the indicator includes two or more groups of resources that each apply to one or both of the downlink direction or the uplink direction.

122. The non-transitory computer-readable medium of clause 121, further comprising code to receive a configuration message indicating an order of applying the two or more groups of resources to the downlink direction or the uplink direction.

123. The non-transitory computer-readable medium of clause 116, wherein the configuration message is one of a radio resource control (RRC) message, a media access control element (MAC-CE), or a DCI.

124. The non-transitory computer-readable medium of clause 123, wherein an order of applying the two or more groups of resources to the downlink direction or the uplink direction is a default order.

125. The non-transitory computer-readable medium of any of clauses 116-124, further comprising code to receive an indication of whether transmissions in an opposite direction at a same time as the one or more scheduled transmissions are cancelled.

126. The non-transitory computer-readable medium of clause 125, wherein the indication is one of a radio resource control (RRC) message, a media access control element (MAC-CE), the indicator, or a DCI.

127. The non-transitory computer-readable medium of any of clauses 116-126, wherein the code to cancel the one or more transmissions comprises code to cancel an applied type of transmission.

128. The non-transitory computer-readable medium of clause 127, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

129. The non-transitory computer-readable medium of clause 128, wherein the applied type of transmission for the uplink direction includes one of: a physical uplink control channel (PUCCH), a physical uplink shared channel (PUSCH), a physical random access channel (PRACH), or a combination thereof.

130. The non-transitory computer-readable medium of clause 128, wherein the applied type of transmission is indicated by one of a radio resource control (RRC) message, a media access control element (MAC-CE), the indicator, or a DCI.

131. The non-transitory computer-readable medium of any of clauses 116-130, wherein the code to cancel the one or more transmissions comprises code to cancel a portion of at least one of the transmissions that overlaps the group of resources.

132. The non-transitory computer-readable medium of any of clauses 116-130, wherein the code to cancel the one or more transmissions comprises code to cancel an entire transmission that partially overlaps the group of resources.

133. The non-transitory computer-readable medium of any of clauses 116-130, wherein the code to cancel the one or more transmissions comprises code to cancel a portion of the transmission that overlaps the group of resources based on a type of the transmission or cancelling all of the transmission based on a type of the transmission.

134. The non-transitory computer-readable medium of any of clauses 116-133, wherein the indicator includes a downlink control information (DCI).

135. A non-transitory computer-readable medium storing computer executable code, the code when executed by a processor instructs the processor to:

transmit an indicator that indicates cancellation of one or more scheduled transmissions on a group of resources, wherein the indicator has a format that is configurable to indicate whether scheduled transmissions in a downlink direction, an uplink direction, or both are cancelled; and cancel one or more transmissions in response to the indicator.

136. The non-transitory computer-readable medium of clause 135, wherein the indicator includes an indication of the group of resources and zero or more flags indicating a direction of transmissions that are canceled.

137. The non-transitory computer-readable medium of clause 136, further comprising code to transmit a configuration message indicating which flags are included in the indicator.

138. The non-transitory computer-readable medium of clause 137, wherein the configuration message is one of a radio resource control (RRC) message, a media access control element (MAC-CE), or a DCI.

139. The non-transitory computer-readable medium of clause 136, wherein the code to cancel the one or more transmissions comprises code to cancel a transmission in a default direction when the indicator includes none of the flags indicating the direction of the one or more transmissions that are canceled.

140. The non-transitory computer-readable medium of clause 135, wherein the indicator includes two or more groups of resources that each apply to one or both of the downlink direction or the uplink direction.

141. The non-transitory computer-readable medium of clause 140, further comprising code to transmit a configuration message indicating an order of applying the two or more groups of resources to the downlink direction or the uplink direction.

142. The non-transitory computer-readable medium of clause 141, wherein the configuration message is one of a radio resource control (RRC) message, a media access control element (MAC-CE), or a DCI.

143. The non-transitory computer-readable medium of clause 140, wherein an order of applying the two or more groups of resources to the downlink direction or the uplink direction is a default order.

144. The non-transitory computer-readable medium of any of clauses 135-143, further comprising code to transmit an indication of whether transmissions in an opposite direction at a same time as the one or more scheduled transmissions are cancelled.

145. The non-transitory computer-readable medium of clause 144, wherein the indication is one of a radio resource control (RRC) message, a media access control element (MAC-CE), the indicator, or a DCI.

146. The non-transitory computer-readable medium of any of clauses 135-145, wherein the code to cancel the one or more transmissions comprises code to cancel an applied type of transmission.

147. The non-transitory computer-readable medium of clause 146, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

148. The non-transitory computer-readable medium of clause 146, wherein the applied type of transmission for the uplink direction includes one of: a physical uplink control channel (PUCCH), a physical uplink shared channel (PUSCH), a physical random access channel (PRACH), or a combination thereof.

149. The non-transitory computer-readable medium of clause 146, wherein the applied type of transmission is indicated by one of one of a radio resource control (RRC) message, a media access control element (MAC-CE), the indicator, or a DCI.

150. The non-transitory computer-readable medium of any of clauses 135-149, wherein the code to cancel the one or more transmissions comprises code to cancel a portion of at least one of the transmissions that overlaps the group of resources.

151. The non-transitory computer-readable medium of any of clauses 135-149, wherein the code to cancel the one or more transmissions comprises code to cancel an entire transmission that partially overlaps the group of resources.

152. The non-transitory computer-readable medium of any of clauses 135-149, wherein the code to cancel the one or more transmissions comprises code to cancel a portion of the transmission that overlaps the group of resources based on a type of the transmission or cancelling all of the transmission based on a type of the transmission.

153. The non-transitory computer-readable medium of any of clauses 135-52, wherein the indicator includes a downlink control information (DCI).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
  receiving a configuration message indicating a number of one or more flags that are included in an indicator;
  receiving the indicator that indicates a group of resources and cancellation of one or more scheduled transmissions on the group of resources, wherein the indicator includes the indication of the group of resources, and wherein the one or more flags indicate a direction of transmissions that are canceled are each configurable to indicate one of: a downlink direction, an uplink direction, or both of the downlink direction and the uplink direction; and
  cancelling one or more transmissions in response to the indicator.

2. The method of claim 1, wherein the indicator is a physical downlink control channel (PDCCH) downlink control information (DCI).

3. The method of claim 1, wherein cancelling the one or more transmissions comprises cancelling a transmission in a default direction when none of the flags indicating the direction of the one or more transmissions that are canceled are set in the indicator.

4. The method of claim 1, wherein the indicator includes two or more groups of resources that each apply to one or both of the downlink direction or the uplink direction.

5. The method of claim 4, further comprising receiving a configuration message indicating an order of applying the two or more groups of resources to the downlink direction or the uplink direction.

6. The method of claim 4, wherein an order of applying the two or more groups of resources to the downlink direction or the uplink direction is a default order.

7. The method of claim 1, further comprising receiving an indication of whether transmissions in an opposite direction at a same time as the one or more scheduled transmissions are cancelled.

8. The method of claim 1, wherein cancelling the one or more transmissions in response to the indicator comprises cancelling an applied type of transmission.

9. The method of claim 8, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

10. The method of claim 8, wherein the applied type of transmission for the uplink direction includes one of: a physical uplink control channel (PUCCH), a physical uplink shared channel (PUSCH), a physical random access channel (PRACH), or a combination thereof.

11. The method of claim 1, wherein cancelling the one or more transmissions in response to the indicator comprises cancelling a portion of at least one of the transmissions that overlaps the group of resources.

12. The method of claim 1, wherein cancelling the one or more transmissions in response to the indicator comprises cancelling an entire transmission that partially overlaps the group of resources.

13. The method of claim 1, wherein cancelling the one or more transmissions in response to the indicator comprises cancelling a portion of the transmission that overlaps the group of resources based on a type of the transmission or cancelling all of the transmission based on a type of the transmission.

14. A method of wireless communication, comprising:
  transmitting a configuration message indicating a number of one or more flags that are included in an indicator;
  transmitting the indicator that indicates a group of resources and cancellation of one or more scheduled transmissions on the group of resources, wherein the indicator includes the indication of the group of resources, and wherein the one or more flags indicate a direction of transmissions that are canceled and are each configurable to indicate one of: a downlink direction, an uplink direction, or both of the downlink direction and the uplink direction; and
  cancelling one or more transmissions in response to the indicator.

15. The method of claim 14, wherein the indicator is a physical downlink control channel (PDCCH) downlink control information (DCI).

16. The method of claim 1, wherein cancelling the one or more transmissions comprises cancelling a transmission in a default direction when none of the flags indicating the direction of the one or more transmissions that are canceled are set in the indicator.

17. The method of claim 14, wherein the indicator includes two or more groups of resources that each apply to one or both of the downlink direction or the uplink direction.

18. The method of claim 17, further comprising transmitting a configuration message indicating an order of applying the two or more groups of resources to the downlink direction or the uplink direction.

19. The method of claim 17, wherein an order of applying the two or more groups of resources to the downlink direction or the uplink direction is a default order.

20. The method of claim 17, further comprising transmitting an indication of whether transmissions in an opposite direction at a same time as the one or more scheduled transmissions are cancelled.

21. The method of claim 14, wherein cancelling the one or more transmissions in response to the indicator comprises cancelling an applied type of transmission.

22. The method of claim 21, wherein the applied type of transmission for the downlink direction includes one of: a channel state information reference signal (CSI-RS), a synchronization signal block (SSB), a physical downlink shared channel (PDSCH), a physical downlink control channel (PDCCH), a positioning reference signal (PRS), or a combination thereof.

23. The method of claim 21, wherein the applied type of transmission for the uplink direction includes one of: a physical uplink control channel (PUCCH), a physical uplink shared channel (PUSCH), a physical random access channel (PRACH), or a combination thereof.

24. The method of claim 14, wherein cancelling the one or more transmissions in response to the indicator comprises cancelling a portion of at least one of the transmissions that overlaps the group of resources.

25. The method of claim 14, wherein cancelling the one or more transmissions in response to the indicator comprises cancelling an entire transmission that partially overlaps the group of resources.

26. The method of claim 14, wherein cancelling the one or more transmissions in response to the indicator comprises cancelling a portion of the transmission that overlaps the group of resources based on a type of the transmission or cancelling all of the transmission based on a type of the transmission.

27. An apparatus for wireless communication, comprising:
  a memory storing computer-executable instructions; and
  at least one processor coupled to the memory and configured to execute the instructions to:
    receive a configuration message indicating a number of one or more flags that are included in an indicator;
    receive the indicator that indicates a group of resources and cancellation of one or more scheduled transmissions on the group of resources, wherein the indicator includes the indication of the group of resources, and wherein the one or more flags indicate a direction of transmissions that are canceled and are configurable to indicate one of: a downlink direction, an uplink direction, or both of the downlink direction and the uplink direction; and
    cancel one or more transmissions in response to the indicator.

28. An apparatus for wireless communication, comprising:
  a memory storing computer-executable instructions; and
  at least one processor coupled to the memory and configured to execute the instructions to:
    transmit a configuration message indicating a number of one or more flags that are included in an indicator;
    transmit the indicator that indicates a group of resources and cancellation of one or more scheduled transmissions on the group of resources, wherein the indicator includes the indication of the group of resources, and wherein the one or more flags indicate a direction of transmissions that are canceled and are each configurable to indicate one of: a downlink direction, an uplink direction, or both of the downlink direction and the uplink direction; and
cancel one or more transmissions in response to the indicator.

* * * * *